United States Patent
Ganz et al.

Patent Number: 5,531,265
Date of Patent: Jul. 2, 1996

[54] METHOD OF OPERATING HEAT EXCHANGERS

[75] Inventors: Rudolf Ganz, Lauf; Ottmar Rosenfelder; Barbara Schwandner, both of Selb, all of Germany

[73] Assignee: Hoechst CeramTec Aktiengesellschaft, Selb, Germany

[21] Appl. No.: 332,725

[22] Filed: Nov. 1, 1994

[30] Foreign Application Priority Data

Nov. 3, 1993 [DE] Germany ............... 43 37 471.9

[51] Int. Cl.$^6$ .................................................. F28B 1/00
[52] U.S. Cl. ............................................. 165/110; 165/166
[58] Field of Search ................................. 165/110, 133, 165/167, 166; 454/1, 41

[56] References Cited

U.S. PATENT DOCUMENTS

| | | | |
|---|---|---|---|
| 227,457 | 5/1883 | Campbell | 454/41 X |
| 4,211,276 | 7/1980 | Itoh et al. | 165/133 X |
| 4,274,481 | 6/1981 | Ireland et al. | 165/166 X |
| 4,488,920 | 12/1984 | Danis | 165/167 X |
| 4,749,032 | 6/1988 | Rosman et al. | 165/167 |
| 4,890,670 | 1/1990 | Schiessl | 165/166 X |
| 5,063,995 | 11/1991 | Förster et al. | 165/167 X |

FOREIGN PATENT DOCUMENTS

| | | |
|---|---|---|
| 3216134 | 11/1983 | Germany. |
| 8520831 | 8/1985 | Germany. |
| 9104689 | 6/1991 | Germany. |
| 4022654 | 1/1992 | Germany. |
| 4238192 | 5/1994 | Germany. |
| 4238190 | 5/1994 | Germany. |
| 4238191 | 5/1994 | Germany. |
| 907583 | 10/1962 | United Kingdom. |
| 2122738 | 1/1984 | United Kingdom. |

OTHER PUBLICATIONS

Bernd Mettenleiter: "Brennwerttachnik, Ein Beltrag zur Schadstoff-Reduzierund und Energissinsparung." Teile 1–lll, Warmetechnik 1993, 195–199, 284–290, 386–393.
Information sheet "Brennwerttechnik–richtig definiert" of Construktal, distributed in Spring 1993 at the fair ISH.

*Primary Examiner*—John Rivell
*Assistant Examiner*—Christopher Atkinson
*Attorney, Agent, or Firm*—Foley & Lardner

[57] ABSTRACT

In the method of operating heat exchangers by means of hot gas streams containing condensable components, the hot gas stream (1) is divided into substreams (4) and cooled by means of obstacles (3) having a temperature T which is small in comparison with the entry temperature $T_I$ of the hot gas stream (1), in particular less than the dew point temperature $T_D$ of the hot gas stream (1). The substreams (4) are, after leaving the obstacles (3), combined with one another and, in their cores (8), divided into other substreams (6) and cooled by means of further obstacles (3) at the temperature T. This procedure is repeated until the hot gas stream (7) leaving the heat exchanger (2) reaches an exit temperature $T_O$ of from 200° C. to 60° C., preferably from 120° C. to 80° C.

15 Claims, 1 Drawing Sheet

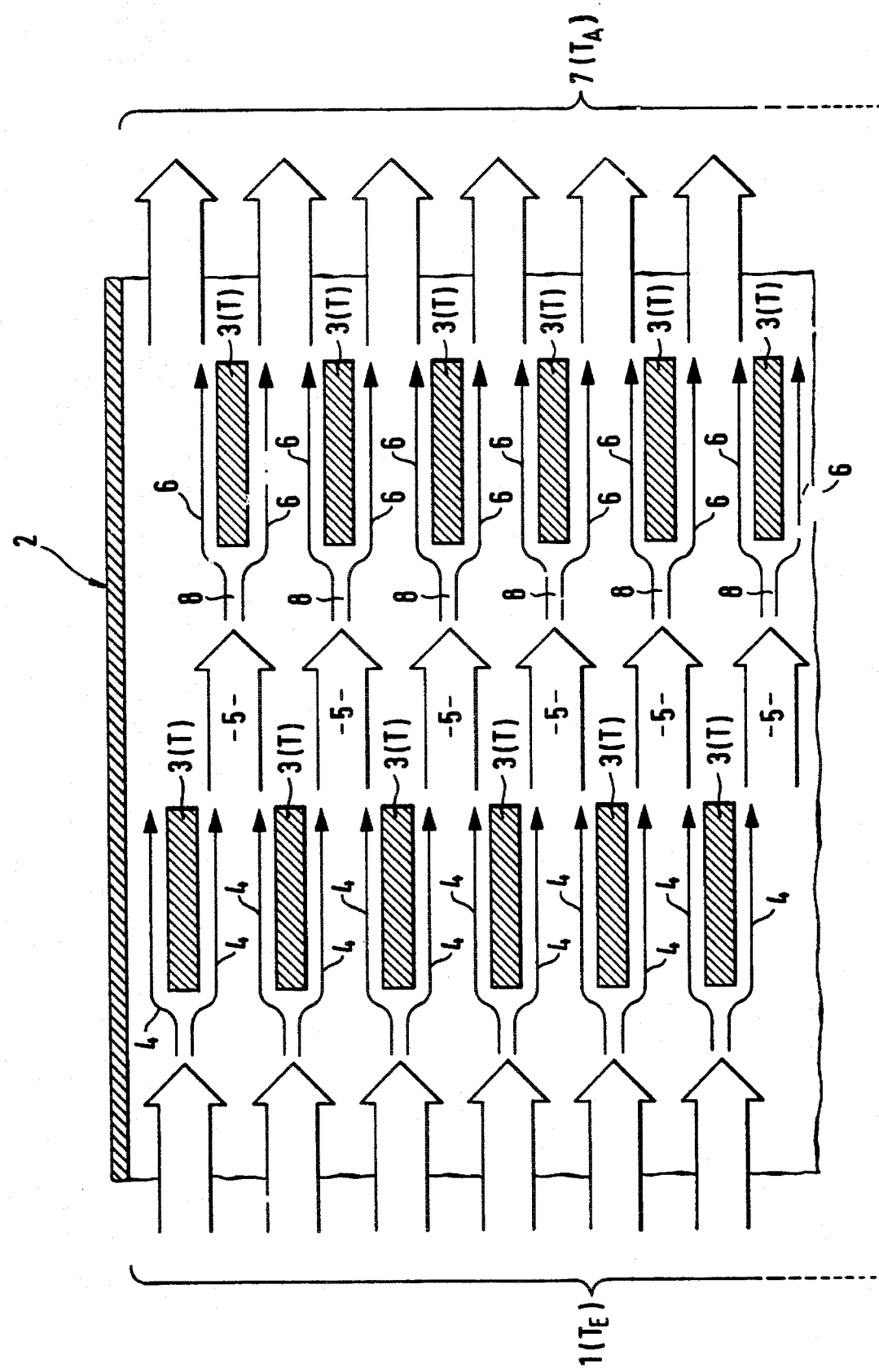

METHOD OF OPERATING HEAT EXCHANGERS

The invention relates to a method of operating heat exchangers by means of hot gas streams which contain components capable of condensation. Methods of the type mentioned are known. In these methods using the so-called calorific value technique, temperatures below the dew point are avoided by an appropriate operating procedure to prevent corrosion due to condensate formation on the heat exchanger or in the system for conducting away the waste gas. Here it is necessary to do without the latent heat stored in the hot gas, which can be considerable, depending on the content of condensable components (e.g. about 11% when burning natural gas L and about 6% when burning heating oil EL).

According to another method, the so-called useful heat technique, attempts are made to substantially utilize the latent heat present in the hot gas. In this method, the hot gases are cooled to below their dew point. Based on the composition of the hot gas on entry into the heat exchanger, the dew point for natural gas L is about 57° C. and for heating oil EL is about 48° C. The condensate formed, essentially water, contains, inter alia, contaminants such as sulfurous, nitrous and carbonic acid which make the condensate significantly acid. The degree of acidity is, depending on the type of primary energy (oil, gas, industrial gases, processed gases, etc.), between $1.5 < pH < 5.5$. Since the condensation in the heat exchangers is generally not complete, the cooled hot gas still contains condensable components which enter the system for conducting away the waste gas. Thus, in this method, not only the heat exchanger but also the system for conducting away the waste gas has to be made acid-proof to avoid corrosion damage by the condensate. In many applications, in particular in the replacement of existing plants operating according to the calorific value technique by plants operating according to the useful heat technique, this results in a considerable increase in the system costs, frequently exceeding the level acceptable to the customer. This is particularly true for plants which are operated using heating oil, which in contrast to natural gas is not desulfurized and thus the heating oil condensate is significantly more aggressive than natural gas condensate.

The invention is to provide a solution to this. The object is achieved by a method of the type mentioned in the introduction, which comprises dividing into substreams and cooling the hot gas stream by means of obstacles having a temperature T which is small in comparison with the entry temperature $T_I$ of the hot gas stream, in particular less than the dew point temperature $T_D$ of the hot gas stream, combining the substreams with one another after leaving the obstacles and dividing and cooling these substreams in their cores by means of further obstacles to give other substreams, with this procedure being repeated until the hot gas stream leaving the heat exchanger has reached an exit temperature $T_O$ of from 200° C. to 60° C., preferably from 120° C. to 65° C., in particular from 100° C. to 70° C.

The advantages of this method are essentially that a significant part of the condensation energy present in the hot gas can be utilized, without having to replace the conventional stack which is not corrosion resistant or sooting resistant. Owing to the turbulent mixing of the hot gas and the improved heat transfer thus achieved, the hot gas is dried sufficiently for further noticeable condensation to occur only at temperatures far below the dew point, based on the composition of the hot gas on entry into the heat exchanger.

The method of the invention is illustrated below by means of the figure, a schematic representation of the flow path in the heat exchanger.

A hot gas stream 1 containing water vapor and having a temperature of from 150° C. to 1400° C. is passed into the heat exchanger 2. In the heat exchanger 2, the hot gas stream 1 meets obstacles 3 which are maintained at a temperature T which is small in comparison with the entry temperature $T_I$ of the hot gas stream 1, in particular less than the dew point temperature $T_D$ of the hot gas stream 1. The obstacles preferably have a high thermal conductivity and a rough surface. In particular, the thermal conductivity of the obstacles $TC \geq 60$ W/mK and the roughness of the obstacles is $R_a \geq 2$ µm. By means of the obstacles 3, the hot gas stream 1 is divided into substreams 4, cooled and, after leaving the obstacles 3, combined with adjacent substreams 4, thereby forming new substreams 5, which new streams are divided and cooled in their cores 8 at the obstacles 3 to give substreams 6. This procedure is repeated until the hot gas stream 7 leaving the heat exchanger 2 has an exit temperature $T_O$ of from 200° C. to 60° C., preferably from 120° C. to 65° C., in particular from 100° C. to 70° C.

Heat exchangers which can be used according to the invention are described in DE 40 22 654, DE 42 38 190, DE 42 38 191 and in DE 42 38 192.

Using the method of the invention, from about 10 to 70% of the water vapor present in the hot gas can be condensed even at hot gas exit temperatures of 200° C. In operation according to the invention, condensation performance, measured in % of the theoretically possible condensation performance, of up to 100% is achieved.

EXAMPLES

Use was made of a ceramic heat exchanger made of silicon-infiltrated silicon carbide and having external dimensions of 300 mm width, 300 mm height and 150 mm depth and having a heat exchange area of 3.2 m² on the hot gas side. This heat exchanger is described in more detail in DE 42 38 190 and has a structure as shown in FIG. 1. The thermal conductivity of the heat exchanger material at 100° C. was from about 90 to 100 W/mK. The roughness of the surfaces of the obstacles present in the heat exchanger was determined using a number of measurements as being in the $R_a$ range from 5 to 12 µm. The cooling water flow was in each case 3 m³/h and was conducted in five-fold cross-countercurrent flow by means of diverter hoods on the water side. The hot gas was passed essentially straight through the heat exchanger as natural gas L waste gas. The dew point was about 57° C. The measurement results obtained are shown in Table 1.

TABLE 1

| | Cooling water | | Hot gas | | | Performance | |
|---|---|---|---|---|---|---|---|
| Example | $T_{in}$ [°C.] | $T_{out}$ [°C.] | $T_{in}$ [°C.] | $T_{out}$ [°C.] | Mass flow [kg/h] | Condensation [kW] | Total [kW] |
| 1 | 60 | 75 | 500 | 105 | 540 | 0 | 65 |
| 2 | 10 | 20 | 500 | 45 | 358 | 3.8 | 49 |
| 3 | 10 | 30 | 1000 | 56 | 275 | 9.3 | 88 |
| 4 | 10 | 31 | 750 | 70 | 447 | 7.2 | 99 |
| 5 | 10 | 38 | 751 | 96 | 631 | 6.9 | 131 |
| 6 | 10 | 47 | 1200 | 102 | 452 | 12.9 | 173 |

Example 1 demonstrates as comparative example the lack of condensation when the cooling water temperatures are too high. Examples 2 to 6 show the measurement conditions and results using the useful heat technique. In the examples 2 and 3 the hot gas exit temperature lies outside the temperature range of the invention. The examples 4 and 6 which are according to the invention have a condensation performance which is comparatively high despite the hot gas mass flow which is very high for this heat exchanger.

We claim:

1. A method of operating a heat exchanger by means of a hot gas stream having an entry temperature $T_I$ when entering the heat exchanger and containing condensable components, which method comprises dividing the hot gas stream into substreams, cooling the substreams by means of obstacles having a temperature T which is lower than the entry temperature $T_I$ of the hot gas stream, combining the substreams with one another after leaving the obstacles to give combined new substreams, and dividing and cooling said combined new substreams in their cores by means of further obstacles at a temperature T to give other substreams, wherein this procedure is repeated until the hot gas stream leaving the heat exchanger has reached an exit temperature $T_O$ of from 200° C. to 60° C., and wherein $T_O$ is above the dew point temperature $T_D$ of the hot gas stream, and wherein at least a portion of the condensable components of the hot gas stream are condensed in the heat exchanger.

2. A method according to claim 1 wherein the temperature T of the obstacles is lower than the dew point temperature $T_D$ of the hot gas stream.

3. A method according to claim 1 wherein said procedure is repeated until the hot gas stream leaving the heat exchanger has reached an exit temperature $T_O$ of from 120° C. to 65° C.

4. A method according to claim 1 wherein said procedure is repeated until the hot gas stream leaving the heat exchanger has reached an exit temperature $T_O$ of from 100° C. to 70° C.

5. A method according to claim 1 wherein the obstacles have a thermal conductivity TC≧60 W/m·K.

6. A method according to claim 1 wherein the obstacles have a surface roughness $R_a$≧2 μm.

7. A method according to claim 1, wherein the hot gas stream comprises natural gas or heating oil.

8. A method according to claim 1, wherein the hot gas stream has an entry temperature $T_I$ of 150° to 1400° C.

9. A method according to claim 1, wherein the heat exchanger is a ceramic heat exchanger.

10. A method according to claim 9, wherein the ceramic comprises silicon-infiltrated silicon carbide.

11. A method according to claim 9, wherein the thermal conductivity of the ceramic at 100° C. is from 90 to 100 W/mK.

12. A method according to claim 1, wherein the obstacles have a surface roughness of 5 to 12 micrometers.

13. A method according to claim 1, wherein cooling water is flowed through the heat-exchanger.

14. A method according to claim 13, wherein the cooling water has a cross-countercurrent flow.

15. A method according to claim 1, wherein the condensable components comprises water.

* * * * *